United States Patent [19] [11] 4,258,095

Larson et al. [45] Mar. 24, 1981

[54] REDUCED GLOSS IN PRESSURE-FIXING OF TONER POWDER

[75] Inventors: Roger L. Larson; Morgan J. Tamsky, both of Saint Paul, Minn.

[73] Assignee: Minnesota Mining and Manufacturing Company, St. Paul, Minn.

[21] Appl. No.: 960,035

[22] Filed: Nov. 13, 1978

[51] Int. Cl.$^3$ .................................................. B32B 3/00

[52] U.S. Cl. .......................................... 428/172; 118/44; 118/115; 118/116; 427/14.1; 427/194; 427/278; 430/98

[58] Field of Search ................. 427/22, 194; 29/121.8; 432/60; 118/60; 355/3 FU; 430/98

[56] References Cited

U.S. PATENT DOCUMENTS

| | | | |
|---|---|---|---|
| 3,810,776 | 5/1974 | Banks et al. | 427/194 |
| 3,880,577 | 4/1975 | Tomono et al. | 432/60 |
| 4,000,957 | 1/1977 | Ruhland | 427/22 |
| 4,065,585 | 12/1977 | Jelfo et al. | 427/22 |

FOREIGN PATENT DOCUMENTS 2721684 11/1977 Fed. Rep. of Germany ........ 355/3 FU

OTHER PUBLICATIONS

*IBM Technical Disclosure Bulletin,* vol. 15, No. 3, Aug. 1972 "Roll Fuser Release Agent", T. C. Smith, D. C. Stapleton, p. 985.

*Xerox Disclosure Journal,* vol. 2, No. 3, May/Jun. 1977, "Fuser Roll Having Rough Surface", Donald A. Seanor, p. 99.

*Primary Examiner*—Bernard D. Pianalto

*Attorney, Agent, or Firm*—Cruzan Alexander; Donald M. Sell; James V. Lilly

[57] ABSTRACT

A novel apparatus and method for pressure fixing imaging powder to a receptor (such as paper) to produce photocopies having reduced gloss is provided. The apparatus comprises non-compliant pressure members (e.g., pressure rollers) one of which has a surface of defined texture or roughness. An offset prevention material is applied to the textured pressure member such that offset of imaging powder from a receptor passing between the pressure members to the textured pressure member is essentially prevented.

7 Claims, 2 Drawing Figures

REDUCED GLOSS IN PRESSURE-FIXING OF TONER POWDER

BACKGROUND OF THE INVENTION

This invention relates to electrostatic duplication or copying processes. More particularly, this invention provides photocopies with reduced gloss and a method and apparatus for producing such copies.

Electrostatic copying processes generally comprise the steps of electrostatically charging a selectively photo-dischargeable permanent or expendable member in the absence of visible light, exposing the charged member to selectively reflected visible light to create thereon a latent (i.e., invisible) charge pattern comprising electrostatically charged areas on a discharged background, developing the latent charge pattern with visible electroscopic imaging powder (known in the art as "toner") which is electrostatically attracted to the charged areas of the pattern, and permanently fixing the electroscopic powder. In the so called, "transfer process" a permanent photo-dischargeable member is employed, the developed charge pattern (i.e., the electrostatically attracted toner) being transferred to an expendable substrate, e.g. paper, before the toner is fixed. In the "direct process", the photo-dischargeable member comprises an expendable electrostatic copy paper, the toner being permanently affixed to the copy paper without transfer. The present invention provides a method and apparatus for fixing toner powders in both direct and transfer processes.

Methods of permanently affixing toners to photo-dischargeable substrates generally fall into two classes. The first of these methods is the so called heat-setting or heat-fusing method. In this method, a toner comprising a thermoplastic resin is employed. The thermoplastic toner powder is affixed to the substrate by exposing the developed latent image to heat (e.g., 100° C. to about 200° C.) for a time sufficient to soften the toner particles so that they adhere to one another and to the substrate. Heat is usually applied to means of a roller maintained at a pressure of less than about 15 lb/linear inch, 3 kg/linear cm. A second method used to permanently affix toner powders to substrates is pressure fixing. This second technique involves the application of pressures in the range of 25 to 400 pounds per linear inch (5 to 75 kg/linear centimeter) by means of unheated, engaging pressure means, e.g. rollers.

Heat fusing of toner powders, while producing effective results in many cases, is undesirable in that it requires a continuous supply of heat. Continuous heating requires large quantities of electricity, and, in some cases, presents the possibility of overheating the substrate as well as the toner. Additionally, heat fusing or heat fixing of toner powders to substrates generally requires a "warm-up" time period in which the heat-setting members are warmed to the temperature at which toner powders may be heat set. This "warm-up" period usually means a waiting period between the time when the duplicating machine is turned on and when the first copy can be made. Since pressure fixing of toner powders suffers neither of the disadvantages of heat fusing of toners, from the standpoint of energy consumption and convenience it is generally preferable that pressure fixing of toner powders be employed.

Devices for the pressure fixing of toners are known in the art, e.g., U.S. Pat. No. 3,854,975, and U.S. Pat. No. 3,846,151. As is discussed in the U.S. Pat. No. 3,854,975, pressure fixing of toner powders requires a fairly high "load" of toner powder onto the imaging substrate. High loads (i.e., the use of large amounts of toner powder) are required in order to ensure proper fixing of toner powder to the substrate, which usually has substantial variations in surface roughness. Variation in surface roughness of the substrate also requries the use of high fixing pressures to ensure the toner powder is fixed to the substrate in all imaged portions. Extremely smooth pressure rollers have been suggested, e.g. U.S. Pat. No. 3,854,975, as a means to fix toner powders to relatively rough substrates. Smooth pressure rollers and high fixing pressures suffer the disadvantage that they tend to produce imaged substrates with unwanted surface characteristics, i.e., photocopies with shiny or glossy areas.

SUMMARY OF THE INVENTION

The present invention advantageously provides in apparatus for pressure fixing toner powders to a substrate, e.g., paper coated with photoconductive material or plain paper, that does not produce undesirably glossy or shiny copies or redeposit imaging powder to subsequent substrates.

In one aspect the present invention provides an improved apparatus for pressure fixing imaging powder to a receptor or substrate so as to produce photocopies having reduced gloss, said apparatus comprising:

(a) two non-compliant pressure members, one of said members having a textured surface;

(b) means for maintaining said pressure members so as to apply compensated force between said members to fix imaging powder to a receptor passing therebetween with said textured pressure member engaging said receptor on the surface of said receptor having imaging powder thereon;

(c) an imaging powder offset prevention material coated on said textured pressure member in sufficient amount to essentially prevent offset of said imaging powder from said receptor to said textured surface;

(d) means for applying said offset prevention material to said textured surface.

The present invention also provides a method for making photocopies having reduced gloss in a photocopying apparatus, the method including the steps of (a) applying imaging powder to a receptor so as to form thereon an image pattern;

(b) coating a textured pressure member with a sufficient quantity of an offset preventing material so as to essentially prevent offset of said powder from said receptor to said texture pressure member;

(c) pressing said imaging powder by means of said textured pressure member, the textured pressure member engaging said imaging powder and consolidating said powder so as to create a permanent image on said receptor.

BRIEF DESCRIPTION OF THE DRAWINGS

The present invention is described in greater detail hereinafter with reference to the accompanying drawings wherein like reference characters refer to the same elements in the several views and in which.

DETAILED DESCRIPTION OF PREFERRED EMBODIMENT OF THE INVENTION

Figure 1:
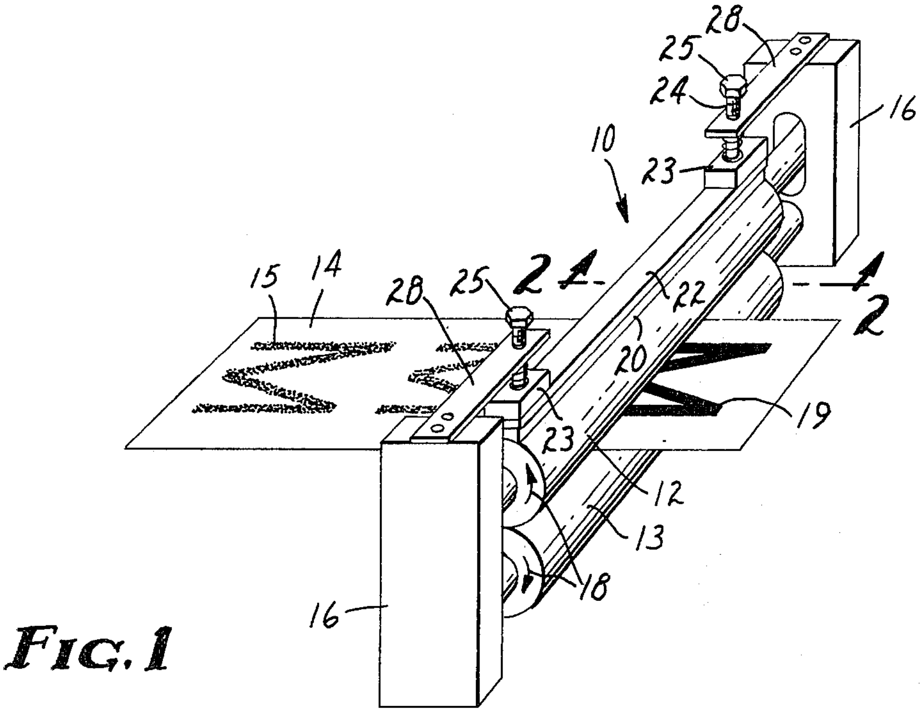
FIG. 1 is a perspective view of one embodiment of the present invention.
Figure 2:
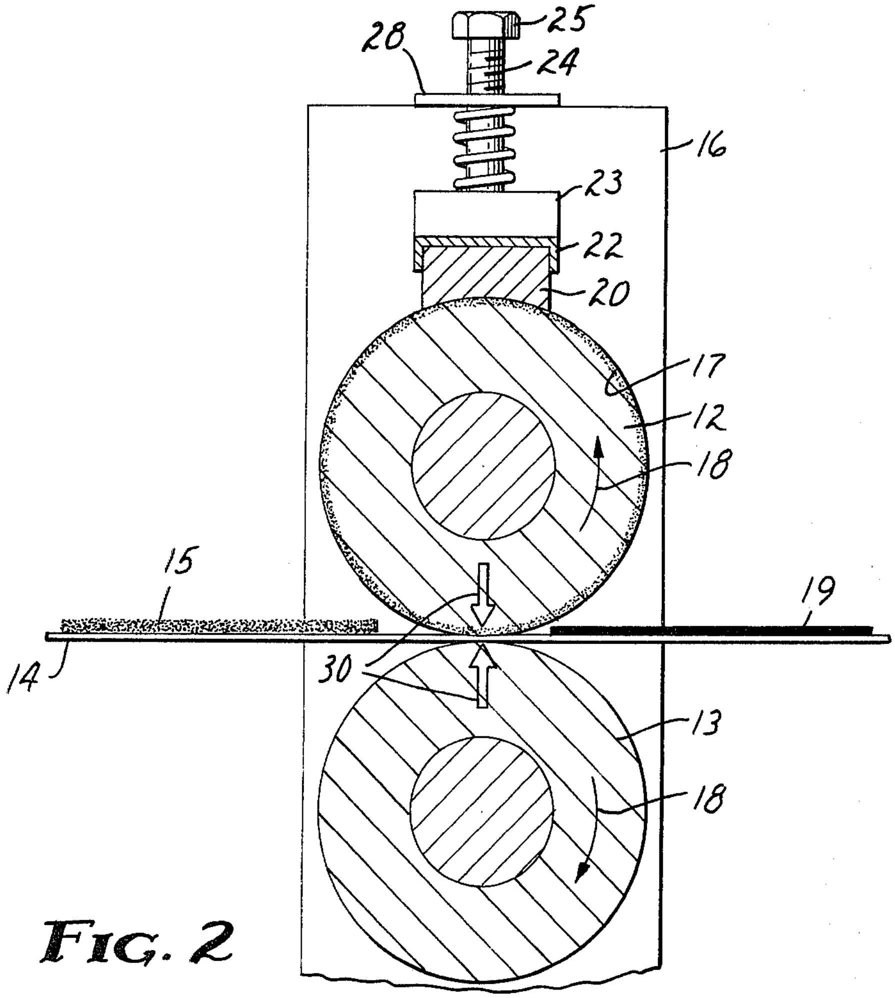
FIG. 2 is a cross-sectional view of the invention of FIG. 1 taken along line 2—2.

FIGS. 1 and 2 depict an apparatus or assembly 10 such as might be installed in a photo copier to pressure fix toner powder. Apparatus 10 comprises two non-compliant pressure members such as rollers 12 and 13 which are aligned so as to apply compensated force to a receptor 14, such as a sheet of paper, the receptor having unfixed imaging powder 15 thereon prior to passing between rollers 12 and 13. The alignment of the pressure rollers is maintained by end supports 16 which permit the pressure rollers to rotate in opposite directions (indicated by arrows 18) and which provide support and containment for any of the various mechanisms which may be employed to press rollers 12 and 13 together with sufficient force to pressure fix toner powder on receptor 14. Pressure member 12 has a matte or textured surface 17 which engages the electrostatically attracted imaging powder 15 on receptor 14 and pressure fixes the toner to the receptor 14 to produce a permanent photocopy having indicia 19 comprised of consolidated, toner which is bonded i.e. pressure fixed, to receptor 14.

The matte surfaced pressure member 12 is coated with a sufficient quantity of an offset preventing material (OPM) to prevent the electrostatically attracted powder 15 from being offset from receptor 14 to textured roller 12. The OPM employed in the embodiment depicted is an elongate bar of soap 20 which is abraded onto textured roller 12. The soap 20 is supported by a "U" shaped transversely supported channel 22 which is adapted to receive soap 20 so as to bias it against roller 12 to prevent the rotational movement of the soap and such that the soap may be abraded thereon. Channel 22 may be supported by brackets 23 and a shaft 24 having thereon an end stop 25 and a spring 26 which provides the force to bias channel 22 having therein soap 20 toward textured roller 12. Shaft 24 and spring 26 may be mounted on end support 16 by means of a flange 28 affixed to end support 16 which prevents vertical or rotational movement of the OPM biasing assembly, i.e., channel 22, shaft 24 and spring 26 and which provides a fixed support against which spring 26 can be abutted.

The two non-compliant pressure members, rollers, or toner fixing means 12, 13 of the present invention are aligned so as to apply compensated force to a receptor having thereon imaging powder or toner. "Non-complaint" as the term is used herein means that the pressure members are sufficiently rigid or stiff that application of force to the members sufficient to fix toner powder does not adversely distort the textured surface on the textured pressure member and thereby reduce its ability to texture a receptor. By "compensated force" it is meant that the pressure members engage each other (their line of closest approach being called in the art the "nip", indicated by large arrows 30) so as to permanently alter the surface of the substrate. Compensated force is applied in an embodiment of the present invention by having a vertically movable roller biased against a non-vertically movable roller by various means such as springs, hydraulic pressure, etc. In the preferred arrangement (depicted in FIGS. 1 and 2), the pressure members are aligned such that their axis are coplanar and parallel, the pressure members rotating in opposite directions. Another possible arrangement is a movable roller rotating around a fixed roller. In yet a third embodiment a skewed roller arrangement with non-coplanar, non-coaxial rollers is possible. Such an arrangement is described in West German Pat. No. 2628-957, which is incorporated by reference herein. Many other ways of applying force to various substrates so as to fix toner powder thereon are taught in the copying art.

Pressure member 12 in the present apparatus has a textured or matte surface. The matte surfaced pressure member tends to produce toner fixed copies having less gloss because there is a reduced tendency to uniformly level the toner particles or the naturally occurring graininess of, for example, a paper substrate. It has been found that the texture or surface roughness of the textured pressure member must fall within a fairly well defined range in order to achieve significant (i.e., 20%) photocopy gloss reduction and still maintain adequate levels of toner adhesion. For example, if the textured pressure member is too rough, non-uniform application of pressure to the toner and substrate results. In this case, the toner electrostatically adhering to the imaged areas would not be evenly fixed. Conversely, if the textured pressure member is too finely textured, no significant gloss reduction is achieved. The required surface roughness of the pressure member which has been found to balance these competing tendencies falls in the range of 10 microinches (0.2 micrometers) to 50 microinches (1.2 micrometers). Surface roughness was measured by means of an instrument having the trade designation "Proficorder" commercially available from the Bendix Corporation. This surface roughness measuring instrument employs a 5 micrometer stylus mounted on a movable arm. The stylus is passed (in a straight line) over the surface to be characterized at a rate of 0.75 cm/min, the stylus exerting a 0.3 g force on the surface. The vertical movement of the stylus over the peaks and valleys of the suface is picked up and amplified electronically. This electrical signal is plotted by an analog recorder from which the roughness can be read based upon calibration of the instrument to an optically flat surface. Surface roughness is reported as root means square distances, the units being microinches or micrometers.

A matte or textured finish may be imparted to a pressure member by any of a number of a methods well known in the art, e.g., chemical etching with strong acids, such as hydrofluoric acid, abrasion by means of extremely hard (e.g., SiC) grit, sandblasting and vapor honing with a stream of, for example water, having therein hard grit. The pressure members or rollers may be fabricated from a variety of materials known to the art. Preferred materials for use in the pressure member include hard chrome plated steel, stainless steel and harder high carbon steels.

The matte finished pressure member or roller of the present invention should be coated with a thin layer of a toner or powder offset preventing material. Liquid offset preventing materials have been suggested for use in photocopying machines wherein smooth pressure members are employed, e.g., U.S. Pat. No., 3,856,692. Liquid offset preventing materials, e.g., silicone fluids may also be employed in the present invention. However, a matte or textured pressure member, having a considerably greater surface area than a smooth pressure member, tends to consume an excessive amount of liquid OPM's, and therefore the use of liquid OPM's is not preferred.

While liquid OPM's are not preferred, there may be some circumstances in which a liquid OPM is required. It has been found that the characteristics of liquid OPM's which may be used with the present textured pressure rollers are generally as follows:

1. The surface tension of liquid materials should be less than 40 to 45 mN/m as measured using ASTM method D-1331-56.

2. Workable liquid OPM's should have a viscosity of greater than 4 to 10 centipoise if the liquid is Newtonian (i.e., a liquid which exhibits a constant viscosity coefficient over a wide range of applied stress, strain rates, and is independent of shearing duration or history.)

3. If the liquid OPM is non-Newtonian, (i.e., all liquids not having the characteristics of the Newtonian fluid defined above) the material should have a shear modulus in terms of the duration of time in the pressure nip of less than about $10^6$ dyne/square centimeters.

"Shear modulus" as the term is used herein is the time dependent analog of the equilibrium shear modulus as measured in an experiment with a specified time pattern. Representative examples of liquid OPM's include fluorochemical fluids such as the inert perfluorochemical liquids having average molecular weights of about 800 and boiling paints in the range of 215° C. commercially available from 3M Company under the trade designation "FC-70", decyl alcohol, heptanoic acid, silicone fluids such as polydimethylsiloxane commercially available from the Dow-Corning, Inc. under the trade designations such "DC 200".

It is preferred in the present invention that a solid OPM be employed. Solid toner OPM's have the advantage of being fabricable into self-supporting bars, rods or other useful shapes. Secondly, solid OPM's can be abraded onto textured pressure rollers. Thirdly, solid OPM's are consumed more slowly when, as described herein, a textured pressure roller is coated with the solid OPM. Lastly, solid OPM's have less tendency to evaporate; consequently the offset preventing material is not lost nor does it produce undesirable vapors.

It has been found that solid OPM's suitable for use with a matte finished pressure roller have specific physical characteristics. The materials should have a melting or softening point above room temperature, and preferably have a melting or softening temperature above the highest ambient temperature to which the materials are exposed in the photocopier. Secondly, solid toner offsetting materials should be capable of forming a continuous layer when deposited onto the matte surfaced pressure roller. A class of materials which tend to form a uniform continuous layer on a matte surfaced pressure roller when deposited thereon (e.g., by abrasion) is "mesomorphic" materials. Mesomorphic materials have a state which is intermediate between that of a liquid and that of a crystal. Like a liquid they tend to flow under pressure (such as that obtainable in a pressure nip) and tend to be abradable (such as by rubbing onto a textured pressure roller) like a solid.

Another important physical requirement of solid OPM's useful in the present invention is that they be powderphobic, or more specifically, tonerphobic. Powderphilicity (the opposite of powderphobicity) is defined as the tendency of a powder, e.g., toner powder, to cling to the surface of a material. Powderphilicity may be qualitatively measured by brushing a quantity of a powder, such as toner powder, onto a surface and attempting to remove the deposited powder by exhaling air over the toner brushed surface. For a given surface, a qualitative determination of the relative powderphobicity of a series of test materials may be established using the above qualitative test.

Powderphobic, mesomorphic materials which can be employed as OPM's in the present invention generally have a softening temperature (i.e. the temperature at which a material loses the ability to support its own weight and begins to flow) which is above about 25° C. These materials tend to flow under the application of pressures of greater than about 5 kg per linear centimeter. At ambient temperatures useful powderphobic mesomorphic OPM's are non-volatile and abradable (i.e., they are neither highly elastic nor tough) having a molecular weight that is generally less than 1000. Useful materials usually have an amphipathic character (i.e., having distinct portions which are opposite in their abilities to attract or repel polar and non-polar media) and may be substantially crystalline or amorphous, and ionic or non-ionic. The preferred representative OPM's are crystalline and ionic containing within their structure up to 30% water (by weight).

A preferred class of mesomorphic, powderphobic OPM's is the salts of long chain, (there being from 8 to 21 carbon atoms in the chain) carboxylic acid or fatty acids which may be generally represented by the formula $$(R-\overset{O}{\overset{\|}{C}}O\overline{)_n}-M$$

wherein R is a linear or branched (preferably linear) saturated or unsaturated hydrocarbon chain having from 8 to 21 carbon atoms, and M is a cation (including ammonium or lower amine) of valence n wherein n can have a value of 1 to 4 inclusive, various of these species comprising 1 to 25% by weight water and being referred to as plain soap, metallic soap, soft soap and hard soap. As discussed below, common, commercially available soaps have been found to be most preferred OPM's for use with textured toner fixing devices.

In addition to having the requisite powder phobicity, soaps possess the mesomorphic properties, discussed above, having the properties of both solids and liquids. At low rates of shear, such as would be experienced by a solid bar of soap being abraded by a matte surfaced pressure roll, soaps display the properties of a solid in that they are abraded onto the textured pressure roll. At short nip duration times (i.e., at high rates of toner fixing) soaps behave fluid-like in that the soap rapidly spreads to a uniform continuous layer thereby achieving maximum toner offset prevention. It is theorized that the mesomorphic, liquid-crystal or slip structure nature of soap provides the unique physical characteristics which makes these materials particularly advantageous OPM's. Soaps which have been found to be usable in the practice of the present invention include, sodium tallow soap commercially available from the Lever Brothers Company under the trade designation "Starlight", potassium tallow soap commercially available from the Procter & Gamble Company under the trade designation "Ivory" and a mixture of alkali soap with a potassium salt of alkyl sulfonic acid commercially available from the Procter and Gamble Company under the trade designation "Zest".

Long chain fatty acids, (in contrast with the long chain fatty acid salts which comprise soap) have been found to be operable in the present invention as OPM's. These materials, because they are more crystalline than their alkali metal analogues tend to be more difficult to abrade and hence require more application force (to the textured pressure roller) and a pressure roller that is able to withstand a greater frictional force. It is theorized that the lack of mesophasic structure of long chain fatty acids significantly increases the difficulty of forming a continuous layer of OPM in the pressure nip.

Fatty acid derivatives (such as esters) have been found suitable for use as offset preventing materials. These materials tend to be softer (as shown in Table 1, below, exceptions to this trend do exist) than either the fatty acid salts or the protonated fatty acids and therefore tend to abrade onto the textured pressure roller at a greater rate (than the acid salts) necessitating more frequent replacement thereof. Additionally, fatty acid derivatives tend to be excessively powderphilic and therefore, while operable as OPM's, are also not preferred.

Hydrocarbon materials have been used as OPM's. Hydrocarbons such as paraffin wax, polyethylene, and octadecane generally are excessively powder philic, and sufficiently crystalline so as to be difficult to abrade or not sufficiently spreadable so as to adequately prevent toner offset. Such materials are therefore not preferred OPM's.

The following examples are intended to illustrate the practice of the invention, but should not be interpreted so as to limit the scope thereof.

EXAMPLES 1-29

Table 1 summarizes the characteristics of offset preventing and powder philicity of a number of materials. All of the materials in Examples 1-29 were solids at room temperature. The various materials in Table 1 were evaluated for their powder philicity and offsetting prevention character as follows:

A series of identical electrostatic images were formed on a substrate (ZnO photoconductive paper) and then developed with a thermoplastic toner powder. The latent electrostatic image having loose toner powder thereon was then passed through the nip (i.e., the line of engagement of the two rollers) of a pair of pressure fixing rollers as shown in the drawing. The roller which contacted the image side of the substrate was matted with No. 1250 Silicon Carbide grit and coated with a layer of the offset prevention material being investigated. The thickness of the OPM coating on the matted pressure roller fell in the range of about 5 micrometers to 10 micrometers, with some of adjustment of of the OPM coating thickness being required to reduce toner offset. The substrate, now having permanently affixed toner powder thereon, was then evaluated to determine how distinct the offset "ghost" images were when multiple copies of the same original were made at the rate of machine operation. Offset "ghost" was subjectively evaluated according to the ease with which offset letters were identifiable on subsequent copies.

The materials of Table 1 fall into the following chemical categories:

Ex. 1-4 The preferred alkali metal salts of long chain fatty acid;

Ex. 5-6 Preferred material of Ex. 1-3 mixed with a lower molecular weight component;

Ex. 7-14 Long chain fatty acids;

Ex. 15-22 Derivatives of fatty acids; and

Ex. 23-29 hydrocarbons.

TABLE 1

Solid Offset prevention materials

| Example No. | Material | Characters Offset | Powder Philic |
|---|---|---|---|
| 1 | Sodium tallow soap "Staylight" | No | No |
| 2 | Potassium tallow soap "Ivory" | No | No |
| 3 | Potassium salt of alkyl sulfinic acid-soap mixture "Zest" | No | No |
| 4 | Coconut oil soap "Kirk's" | No | No |
| 5 | Triethenolamine/ricinileic/ steric acid-soap mixture | No-first few copies bad | Yes |
| 6 | No. 5 + glycerine | No-first few copies bad | Yes |
| 7 | Sodium stearate | No | No |
| 8 | Aluminum stearate | No | No |
| 9 | Calcium stearate | No | No |
| 10 | Zinc Stearate | No | No |
| 11 | Lauric acid | No | No |
| 12 | Myristic acid | No | No |
| 13 | Palmitic acid | No | No |
| 14 | Stearic acid | No | No |
| 15 | Polyoxyethylene (23) lauryl ether (BRIJ35/ICI) | No-First few copies bad | Yes |
| 16 | Steryl dimethyl benzyl ammonium chloride ("Ammonyx 4"-Onyx Chemical Company) | No | Yes |
| 17 | lauric myristic drethanol amide ("Stepan 621"-Stepan Chemical Co.) | No | Yes |
| 18 | Sodium lauryl sulfoacetate ("Lanthanol LAL"-Stepan Chemical Company) | Yes | Yes |
| 19 | Sodium alpha olefin sulfonate ("BioTerge As-90F"-Stepan Chemical Company) | Yes | No |
| 20 | Sodium lauryl sulfate ("1# Sipon WD"-Alcolac Chemical Company) | No | No |
| 21 | Ethylene glycol monostearate | No | Yes |
| 22 | Propylene glycol monostearate | No | Yes |
| 23 | Paraffin wax | No-first few copies bad | Yes |
| 24 | "Bareco polywax 1000" | No | No |
| 25 | Octadecane | No | No |
| 26 | Polyethylene | No | No |
| 27 | "Shellwax 500" | Split Paper | Yes |
| 28 | Witco microcrystalline wax 180 | Yes | Yes |
| 29 | "Amocolwax 15687" | Split Paper | Yes |

EXAMPLE 30

The surface roughness of a series of chromeplated steel pressure rollers was measured as described above. The series of rollers then was employed to pressure fix thermoplastic imaging powder to plain white paper. The surface gloss of the imaged and background areas of the resulting photocopy was measured according to Tappi Standard T 48005-72. Additionally, the adhesion values of the imaged areas was measured according to American Association of Textile Chemists and Colorists test method 8—Colorfastness to crocking—on a "Crockmeter" such as the instrument commercially available from Atlas Electric Devices Company. The adhesion values obtained from each of the pressure rollers in the series were normalized to 1 by dividing the measured image optical densities (after the Crockmeter test, supra) obtained from the pressure roller having greater surface roughness by the optical density measurement obtained from the smooth pressure roller. The appearance of the resulting photocopies was also subjectively evaluated. The results of these evaluations is contained in Table II.

TABLE II

| Surface Roughness | | Surface Gloss | | Normalized | Qualitative |
|---|---|---|---|---|---|
| micro inch rms | micro meter rms | images | Background | Adhesion Value | Visual Appearance |
| <8 | (0.16) | 55.0 | 40.0 | 1.0 | Control = normal heavy gloss |
| 12 | (0.24) | 35.0 | 25.0 | 1.08 | Moderate gloss |
| 20 | (0.4) | 30.0 | 25.0 | 0.97 | Low gloss |
| 30 | (0.6) | 16.0 | 14.0 | 0.97 | Slight gloss |
| 40 | (0.8) | 7.0 | 9.5 | 0.78 | Virtually no gloss |
| 90 | (1.8) | 5.5 | 9.0 | — | Virtually no gloss |
| 200 | (4.0) | 5.0 | 8.0 | 0.69 | Virtually no gloss |

From Table II it can be determined that a surface roughness in the range of 10 (0.2 micrometers) to 40 microinches (0.8 micrometers) reduces both image and substrate gloss approximately 20% from a 'smooth' control (i.e., a pressure member having a roughness of less than 8 microinches rms (0.16 micrometers rms)). As used herein, a "significant" gloss reduction amounts to a reduction of at least 20%. Consistent with the teaching in the art, the generally declining (from 1) normalized adhesion values indicate that toner adhesion decreases as the surface roughness of the pressure roller is increased.

What is claimed is:

1. A photo copying apparatus including means for pressure fixing imaging powder to a receptor so as to produce photocopies having reduced gloss, said apparatus comprising:

(a) two non-compliant pressure members, one of said members having a textured surface that has a surface roughness in the range of about 0.2 to 1.2 micrometers;

(b) means for maintaining said pressure members so as to fix imaging powder to a receptor passing therebetween, said textured pressure member engaging said receptor on the surface of said receptor having imaging powder thereon;

(c) an imaging powder offset preventing material coated on said textured pressure member in sufficient amount to essentially prevent offset of said imaging powder from said receptor to said textured surface, said imaging powder offset preventing material being selected from (i) Newtonian liquids having a surface tension of less than about 40 to 45 mN/m as measured using the DuNouy ring technique and a viscosity of greater than about 4 to 10 centipoise, (ii) non-Newtonian liquids having a surface tension of less than about 40 to 45 mN/m and a shear modulus at the shear rate of copying of less than about $10^6$ dyne/cm$^2$, and (iii) mesomorphic, powderphobic solids;

(d) means for applying said offset prevention material to said textured surface.

2. An apparatus according to claim 1 wherein said pressure members comprise rollers.

3. An apparatus according to claim 1 wherein said liquid offset prevention material is said Newtonian liquid and is selected from the group consisting of silicone fluids, oleic acid or decyl alcohol.

4. An apparatus according to claim 1 wherein said offset prevention material is said mesomorphic, powderphobic solid and comprises a salts of long chain carboxylic acids or fatty acids represented by the formula $$(R-\overset{\overset{O}{\|}}{C}O)_n-M$$

wherein R is a linear or branched saturated or unsaturated alkyl chain having from 8 to 21 carbon atoms, M is a cation of valence n, n having a value of 1 to 4, there being from 1 to 25% by weight water in said offset prevention material.

5. An apparatus according to claim 1 wherein said offset prevention material is selected from the group consisting of soap, lauric acid, stearic acid or octadecane.

6. A method of making photocopies having reduced gloss in a photocopying apparatus including the steps of:

applying imaging powder to a receptor so as to form thereon an image pattern;

providing a textured pressure member that has a surface roughness in the range of about 0.2 to 1.2 micrometers and having a sufficient quantity of an offset preventing material on the surface thereof so as to essentially prevent offset of said powder from said receptor to said textured pressure member under conditions of pressure, said offset preventing material being selected from (i) Newtonian liquids having a surface tension of less than about 40 to 45 mN/m as measured using the DuNouy ring technique and a viscosity of greater than about 4 to 10 centipoise, (ii) non-Newtonian liquids having a surface tension of less than about 40 to 45 mN/m and a shear modulus at the shear rate of copying of less than about $10^6$ dyne/cm$^2$, and (iii) mesomorphic, powderphobic solids; and pressing said imaging powder by means of said textured pressure member engaging said imaging powder and consolidating said powder so as to create a permanent image on said receptor.

7. The photocopy prepared in accordance with claim 6.

* * * * *